US007284065B2

(12) United States Patent
Agarwal et al.

(10) Patent No.: US 7,284,065 B2
(45) Date of Patent: ＊Oct. 16, 2007

(54) SYSTEM AND METHOD FOR PROVIDING RANDOM ACCESS TO A MULTIMEDIA OBJECT OVER A NETWORK

(75) Inventors: Rahul Agarwal, Seattle, WA (US); Jeffrey M. Ayars, Federal Way, WA (US); Bradley D. Hefta-Gaub, Seattle, WA (US); Gary S. Greenbaum, Seattle, WA (US); Alan F. Lippman, Seattle, WA (US); Sujal M. Patel, Seattle, WA (US); Dale R. Stammen, Seattle, WA (US); Philip Rosedale, Seattle, WA (US); Bryan Vergato, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 571 days.

This patent is subject to a terminal disclaimer.

(21) Appl. No.: 10/646,933

(22) Filed: Aug. 22, 2003

(65) Prior Publication Data

US 2004/0046790 A1    Mar. 11, 2004

Related U.S. Application Data

(62) Division of application No. 09/966,375, filed on Sep. 27, 2001, now Pat. No. 6,633,918, which is a division of application No. 09/167,521, filed on Oct. 6, 1998, now Pat. No. 6,314,466.

(51) Int. Cl.
    *G06F 13/00* (2006.01)
(52) U.S. Cl. .................. 709/231; 709/219; 709/232; 709/250; 719/329

(58) Field of Classification Search ................ 709/217, 709/219, 231, 232, 250; 719/328, 329
See application file for complete search history.

(56) References Cited

U.S. PATENT DOCUMENTS

| 5,036,361 | A | * | 7/1991 | Filion et al. ................... 399/81 |
| 5,487,167 | A |   | 1/1996 | Dinallo et al. ............... 395/807 |
| 5,793,980 | A |   | 8/1998 | Glaser et al. ........... 395/200.61 |
| 5,822,524 | A |   | 10/1998 | Chen et al. ................. 709/203 |
| 5,916,309 | A | * | 6/1999 | Brown et al. ................. 710/52 |
| 5,933,603 | A |   | 8/1999 | Vahalia et al. .............. 709/225 |

(Continued)

*Primary Examiner*—Viet D. Vu
(74) *Attorney, Agent, or Firm*—Graybeal Jackson Haley LLP

(57) ABSTRACT

A system and method provide random access to a multimedia object over a network. One embodiment of the invention includes a streaming media server that is connected to a client computer over a network. The streaming media server includes at least one multimedia object that is adapted for transmission ("streaming") across the network. A pre-roll calculation program determines a pre-roll for each segment of the multimedia object and generates a modified multimedia object which includes a pre-roll for each of its segments, a pre-roll identifying a portion of the multimedia object to be transmitted by the streaming media server and received by the client computer prior to playback of the multimedia object at a selected segment. The pre-roll allows the client computer to present, starting at a selected segment, the multimedia object in its entirety without interruption. The pre-roll calculation program further facilitates the design of the multimedia object to minimize delays associated with random accesses to segments of the multimedia object.

29 Claims, 10 Drawing Sheets

U.S. PATENT DOCUMENTS

| | | | |
|---|---|---|---|
| 5,956,321 A | 9/1999 | Yao et al. | 370/230 |
| 5,991,836 A | 11/1999 | Renda | 710/58 |
| 5,996,015 A | 11/1999 | Day et al. | 709/226 |
| 6,040,866 A | 3/2000 | Chen et al. | 709/203 |
| 6,041,345 A | 3/2000 | Levi et al. | 709/217 |
| 6,100,887 A * | 8/2000 | Bormann et al. | 715/764 |
| 6,138,163 A | 10/2000 | Nam et al. | 709/231 |
| 6,141,053 A * | 10/2000 | Saukkonen | 375/240.01 |
| 6,292,834 B1 * | 9/2001 | Ravi et al. | 709/233 |
| 6,396,518 B1 * | 5/2002 | Dow et al. | 715/772 |
| 6,639,687 B1 * | 10/2003 | Neilsen | 358/1.14 |

* cited by examiner

SYSTEM AND METHOD FOR PROVIDING RANDOM ACCESS TO A MULTIMEDIA OBJECT OVER A NETWORK

RELATED APPLICATIONS

This application incorporates by reference in its entirety and is a divisional of U.S. patent application Ser. No. 09/966,375, titled "SYSTEM AND METHOD FOR PROVIDING RANDOM ACCESS TO A MULTIMEDIA OBJECT OVER A NETWORK," filed Sep. 27, 2001, now U.S. Pat. No. 6,633,918 which in turn is a divisional of and incorporates by reference in its entirety U.S. patent application Ser. No. 09/167,521, filed Oct. 6, 1998, now U.S. Pat. No. 6,314,466, issued Nov. 6, 2001.

BACKGROUND OF THE INVENTION

1. Field of the Invention

The invention relates to accessing segments of a media object over a network. More particularly, the invention provides a system and method for determining a preliminary transmission period for a segment of a media object.

2. Description of the Related Art

Streaming media is a method of making audio, video, and other multimedia data available in real-time, over a network. FIG. 1 illustrates a typical streaming media system. If the source of the streaming media is a live performance, the performance is often recorded as a data signal by an input device, such as, for example, a microphone 102 or a camera 104. The input device then sends the data signal to an encoding system 106 which converts the data signal into a digital form and compresses the digital signal into a streamable data object 107. The streamable data object 107 may be sent to a content creation station 108 for editing or may alternatively be sent directly to a streaming media server 110. The content creation station 108 includes content creation software, such as video editing software, that allows the user to modify the streamable data object 107. The content creation station 108 can also be used to independently create a streamable data object 107. After being modified or created by the content creation station 108, the streamable data object 107 may then be transmitted to the streaming media server 110.

Once the streamable data object 107 is located on the streaming media server 110, the streamable data object 107 is made available for further distribution over a network 100, such as the Internet, to one or more client computers 112. The client computer 112 generally requests access to the streamable data object 107, begins receiving portions of it, and begins rendering the streamable data object 107 into a multimedia presentation for an end user.

One problem, however, related to transmitting streaming data objects over a network is that the client computer 112 must determine when it has sufficient data to begin the presentation or playing of the streamable data object 107. One solution has been to require the client computer 112 to store the whole presentation in memory before beginning the display of the presentation. However, this approach consumes significant system resources and creates unacceptable delay between the user's initial request for the media and the start of the presentation. Also, the client computer 112 may not have the system capacity to store the whole streamable data object 107.

Under another approach implemented by some existing systems, the client computer 112 starts playing the streamable data object 107 as soon as it is received. Of the problems with this approach, perhaps the most unacceptable is the periodic freezing or delay during playback caused by a lack of sufficient data to render the streamable data object 107. Bandwidth intensive segments of the streamable data object 107 are often responsible for such. To ensure a seamless presentation, the client computer 112 may require more data from the streaming media server 110 than has been transmitted over the network 100. But the amount of data a client computer 112 can receive in any period of time is restricted by the type of network communication it uses.

For example, assuming that the network 100 is the Internet, it is common for a client computer 112 to use a modem to connect to the Internet. However, modems have limited bandwidth capabilities compared to other transmission mediums, i.e., television, radio, Ethernet. The bandwidth of a communication device is defined by the amount of data that can be communicated over a specified time. A 28.8 Kbps (kilobits per second) modem can transmit or receive around 29,000 bits per second.

Depending on the content of a streamable data object 107, the rate at which data is consumed during presentation of the streamable data object 107 may be much higher than the transmission rate for a particular time interval. In such cases, the client computer 112 of a conventional streaming media system simply waits in the middle of the presentation of the streamable data object 107 for the transmission of additional data, creating an unpleasant interruption for the user.

FIG. 2 is a high level block diagram representing the data transmission process of the prior art. Starting at a state 200, the client computer 112 (FIG. 1) requests the streamable media server 110 (FIG. 1) to start transmitting data of the streamable data object 107. Next, at a state 202, the streaming media server 110 starts sending data of the streamable data object 107 (FIG. 1) to the client computer 112. Moving to a state 204, the client computer 112 starts displaying the presentation of the transmitted data. Continuing to a state 206, the client computer 112 stops the presentation in order to wait for further data. Lastly, at a state 208, the client computer 112 finishes displaying the presentation. Although only one interruption is indicated in the flowchart of FIG. 2, the client computer 112 may suffer from multiple interruptions due to having insufficient data at various times in the rendering process.

For further example, referring to FIGS. 3 and 4, a consumption graph for an exemplary rendering of a streamable data object 107 is described. FIG. 4 shows the target bit rate of the client computer 112 in addition to the consumption graph of FIG. 3. The consumption graph illustrates that the number of bits that are consumed during presentation of a streamable data object 107 varies over time. During the first one second interval of the presentation, the client computer 112 (FIG. 1) consumes 30K bits of data. However, during the next second, the client computer 112 consumes only 10K bits of information. Table 1, based on the consumption graph in FIGS. 3 and 4, further illustrates a situation wherein the total number of bits that are needed by the client computer 112 to maintain an uninterrupted playback is larger than the total number of bits it has received at multiple points in time.

TABLE 1

| Time (seconds) | Bits Needed | Bits Transferred | Total Bits Needed | Total Bits Transferred |
|---|---|---|---|---|
| 1 | 30K | 20k | 30K | 20K |
| 2 | 10K | 20K | 40K | 40K |
| 3 | 30K | 20K | 70K | 60K |

TABLE 1-continued

| Time (seconds) | Bits Needed | Bits Transferred | Total Bits Needed | Total Bits Transferred |
|---|---|---|---|---|
| 4 | 10K | 20K | 80K | 80K |
| 5 | 20K | 20K | 100K | 100K |
| 6 | 10K | 10K | 110K | 110K |

As can be seen from Table 1 and FIG. 2, after one second, in order to seamlessly present the streamable data object 107, the client computer 112 needs 30K bits; however, the client computer 112 has only received 20K bits of the streamable data object 107. Therefore, the client computer 112 has to wait for further data before starting the presentation. Further, after the presentation is started, the client computer 112 has to halt again because the presentation requires 70K bits of data at three seconds, but the client computer has only received 60K bits. This halt manifests itself, in existing systems, by freezing the presentation.

To attempt to overcome this difficulty, some systems transmit a portion of a streamable data object before playback starts. However, all multimedia presentations are not always played from the beginning, and transmitting an initial portion of a streamable data object does not help to address such situations.

The client computer 112 typically has a rendering program (not shown) that allows the user to "seek" to the middle or any number of secondary positions in the presentation before or during playback. After starting to play at the secondary position, the client computer 112 may require more data for the presentation than has been transmitted. Thus, the client computer 112 must pause and wait for the transmission of additional data. One solution to this problem has been to estimate the initial transmission buffer for the secondary position as being equal to or slightly greater than the initial transmission buffer for the whole streamable data object. However, this approach is merely a rough estimate and cannot guarantee that the client computer 112 will render the presentation without further interruptions and additional waits for further data. Thus, this approach does little to ensure a smooth, uninterrupted playback of a media object.

Variations in rendering requirements (data consumption over time) are more apparent in low bandwidth media systems, such as MacroMedia Shockwave Flash 2.0. MacroMedia Shockwave Flash 2.0 is one type of content creation system that generates television-like cartoons for business, entertainment or education. In these low bandwidth media systems, each of the graphical objects ("characters") of the presentation are well defined, and multimedia presentations are often developed wherein these characters move from segment to segment or from frame to frame. Accordingly, the rendering requirements of the presentation vary greatly, generally becoming quite high when a new character is introduced. Due to this variation, the amount of data that would ensure uninterrupted playback if received prior to rendering the streamable data object 107 from its beginning, may differ widely from the amount needed to ensure uninterrupted playback from a secondary position, such as the middle of the streamable data object 107.

Therefore, there is a need for a system and a method that provides for the uninterrupted presentation of streamable data objects, including those streamable media objects imposing rendering requirements that vary over time. Moreover, the system and the method should not require the client computer 112 to store the entire streamable date object before starting the presentation. Further, the system and the method should provide for the uninterrupted rendering of a streamable data object 107 for each of the possible playback positions of the streamable data object 107.

SUMMARY OF THE INVENTION

The system and method of the present invention have several features, no single one of which is solely responsible for its desirable attributes. Without limiting the scope of this invention as expressed by the claims that follow, its more prominent features will now be discussed briefly. After considering this discussion, and particularly after reading the section entitled "Detailed Description of the Invention" one will understand how the features of this invention provide several advantages over traditional streaming systems.

The invention includes a streaming media system that provides for the calculation of a pre-roll for each segment of a multimedia data object. Using the calculated pre-roll, a client computer can render a multimedia presentation starting at each playable position of the multimedia data object with interruption. Further, the streaming media system of the invention minimizes the amount of buffering that is needed before rendering a presentation based upon the multimedia data object.

Further, the streaming media system of the invention has a graphical utility that enables a user to re-arrange the presentation of the multimedia object such that the pre-roll of the multimedia data object is minimized.

One embodiment of the present invention is a method of calculating a pre-roll for a plurality of segments in a multimedia data object. The method comprises identifying a plurality of segments in the multimedia data object, calculating a pre-roll for each of the plurality of segments. An aspect of the embodiment further comprises storing the pre-roll for each of the plurality of segments in the multimedia data object. Another aspect of the embodiment is that wherein calculating a pre-roll includes determining a target bit rate of a client computer. A further aspect of the embodiment is one wherein calculating a pre-roll includes determining the size of each of the plurality of segments, and wherein the pre-roll for each of the plurality of segments corresponds to a minimum amount of data to send to the client computer to enable the client computer to render the multimedia object without interruption starting from the respective segment. Still another aspect of the embodiment is one wherein the data of each segment is examined only once.

Another embodiment of the invention a system for calculating a pre-roll for a plurality of segments in a multimedia data object. The system comprises means for identifying a plurality of segments in the multimedia data object and means for calculating a pre-roll for each of the plurality of segments, the pre-roll for each of the plurality of segments corresponds to a minimum amount of data to send to a client computer to enable the client computer to render the multimedia data object without interruption starting from the respective segment. In another aspect, the embodiment further comprises means for generating the multimedia data object. In still another aspect, the embodiment further comprises means for rendering the multimedia data object into a multimedia presentation. In yet another aspect, the embodiment further comprises means for displaying the pre-roll. In one more aspect, the embodiment further comprises means for storing the pre-roll for each of the plurality of segments in the multimedia data object.

Yet another embodiment of the invention is a system for streaming a multimedia data object across a network. The embodiment comprises (1) a streaming media server operably connected to the network; (2) a client computer operably connected to the network; and (3) a multimedia data object including a segment index, the segment index defining a pre-roll, the pre-roll indicating a transmission of data from the streaming media server to the client computer that occurs before the client computer displays a presentation that is represented by the multimedia data object, the presentation starting at a selected segment of the multimedia data object. Another aspect of the embodiment further comprises a pre-roll calculation program that creates the segment index. Still another aspect of the embodiment is one wherein the selected segment is a frame.

Still another embodiment of the invention is a method of analyzing a multimedia data object that is adapted for rendering on a computer. The method comprises determining the rendering requirements of at least a portion of a multimedia data object; and displaying the rendering requirements of the multimedia data object. Another aspect of the embodiment is one wherein displaying the rendering requirements further includes plotting a consumption graph. Still another aspect of the embodiment is one wherein determining the rendering requirements of at least a portion of the multimedia data object includes identifying a plurality of segments within the multimedia data object; and determining the amount of data within each of the segments of the multimedia data object.

One more embodiment of the present invention is a method of analyzing a multimedia data object that is adapted for rendering by a computer. The method comprises (1) determining a communication bit rate of a second computer; (2) determining the rendering requirements of the second computer for displaying at least a portion of the multimedia data object; (3) determining a pre-roll for said portion of the multimedia data object, the pre-roll corresponding to a minimum amount of data to send to the second computer to enable the second computer to render the multimedia object without interruption starting from the portion; and (4) displaying the pre-roll. Another aspect of the embodiment is one wherein the multimedia data object has a plurality of segments, wherein the method for determining the rendering requirements further includes determining the rendering requirements for each segment of the multimedia data object, and wherein determining the pre-roll further includes determining a pre-roll for each segment of the multimedia data object. Yet another aspect of the embodiment further includes storing the pre-roll. Still another aspect further includes re-organizing the multimedia data object.

Still another embodiment of the present invention a program storage device storing instructions that when executed by a computer perform a method. The method comprises (1) identifying at least two positions within a multimedia data object; (2) determining a communication bit rate of a second computer; (3) determining the rendering requirements of the second computer for rendering the multimedia data object at each of the at least two positions; (4) determining a pre-roll for each of the at least two positions within the multimedia data object; and (5) storing the pre-roll for each of the at least two positions.

Another embodiment of the present invention is a method of streaming a multimedia data object across a network. The method comprises (1) receiving a request for the transmission of a selected portion of a multimedia data object; (2) determining a pre-roll for the selected portion of the multimedia data object, the determining based in part on the rendering requirements of the multimedia data object and the transmission rate of the a client computer; (3) transmitting the multimedia data object to a client computer; and (4) signaling the client computer to start rendering the multimedia data object. In another aspect of the embodiment, the method further comprises rendering the multimedia data object.

Still another embodiment of the present invention is a multimedia data object stored on a computer readable medium. The multimedia data object comprises a plurality of segments; and a segment index, the segment index indicating a pre-roll for each of the plurality of segments. One aspect of the embodiment is one wherein the segment index further comprises the position of each segment within the multimedia data object. Another aspect of the embodiment is one wherein each of the segments is a frame.

Another embodiment of the present invention is a streamable multimedia object stored on a computer readable medium. The streamable multimedia object comprises a multimedia file having a sequence of segments; and a table having an entry for each of a plurality of said segments, each of said entries indicating a minimum amount of data of the multimedia file that must be sent to a client computer before the client computer begins rendering, to enable the client computer to render the multimedia file uninterrupted starting at a segment corresponding to the respective entry, the client computer receiving data at a given bit rate.

One more embodiment of the present invention is a method to facilitate the uninterrupted play of a multimedia file having a sequence of segments by a client computer over a narrow bandwidth network. The method comprises the acts of identifying a plurality of segments within said multimedia file; and determining, for each of said plurality of segments, the minimum amount of data of the multimedia file that must be sent to a client computer before the client computer begins rendering, to enable the client computer to render the multimedia file uninterrupted starting at a respective one of each of said segments, the client computer receiving data at a given bit rate.

Still one more embodiment of the present invention is a multimedia streaming system. The system comprises (1) a network; (2) a multimedia data object; (3) a streaming media server operably connected to the network and the multimedia data object, the streaming media server adapted to stream the multimedia data object over the network; (4) a client computer operably connected to the network, the client computer adapted to receive the multimedia data object over a network, the client computer having a rendering program that is adapted to render the multimedia data object into a multimedia presentation; and (5) a pre-roll calculation program that generates a segment index, the segment index defining a pre-roll, the pre-roll indicating a data transmission that occurs before the client computer renders a multimedia presentation represented by the multimedia data object, the presentation starting at a selected segment of the multimedia data object.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

System Overview

Figure 1:
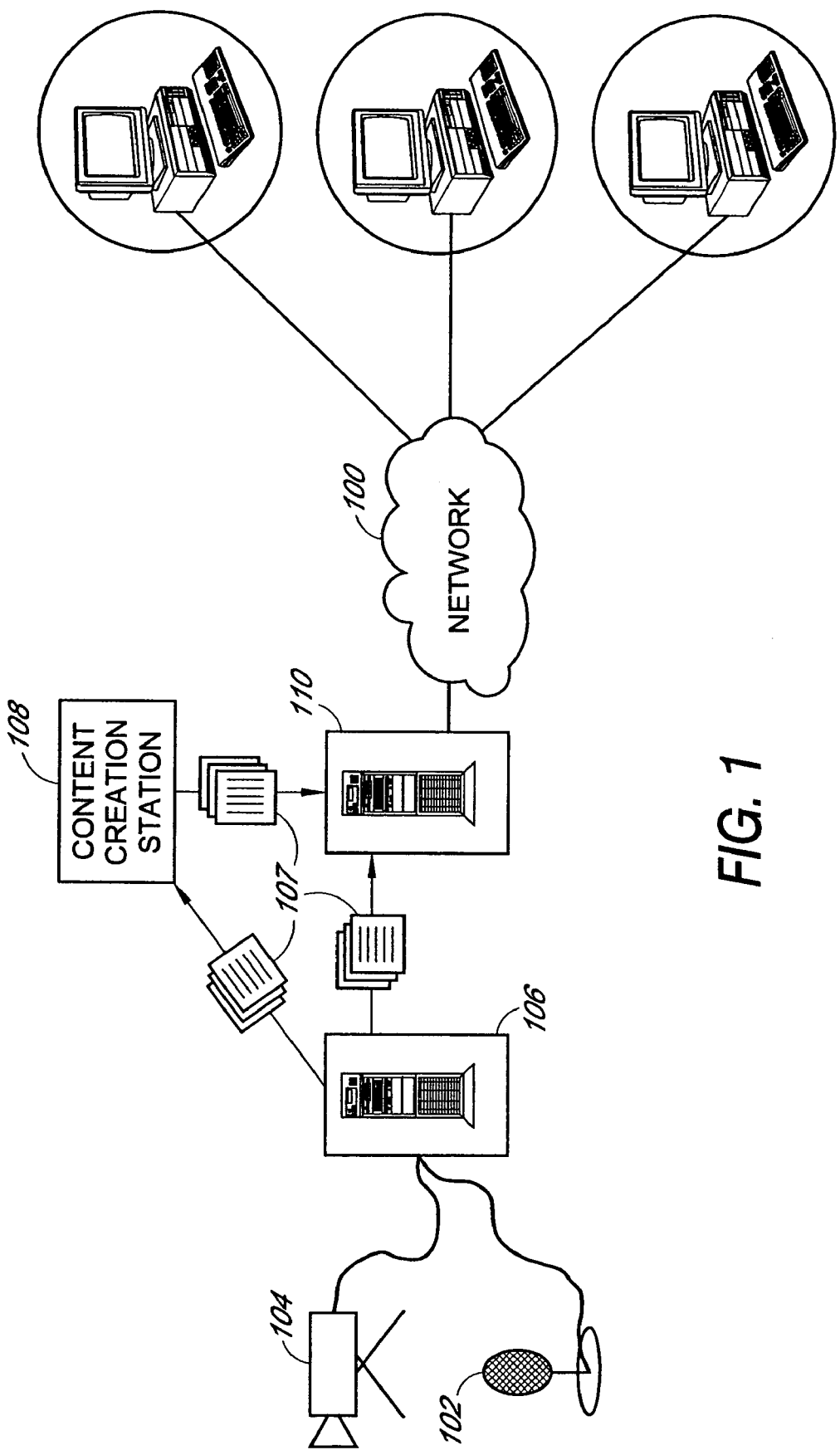
FIG. 1 is a high-level block diagram of a streamable media system having a streamable media server and at least one client computer.
Figure 2:
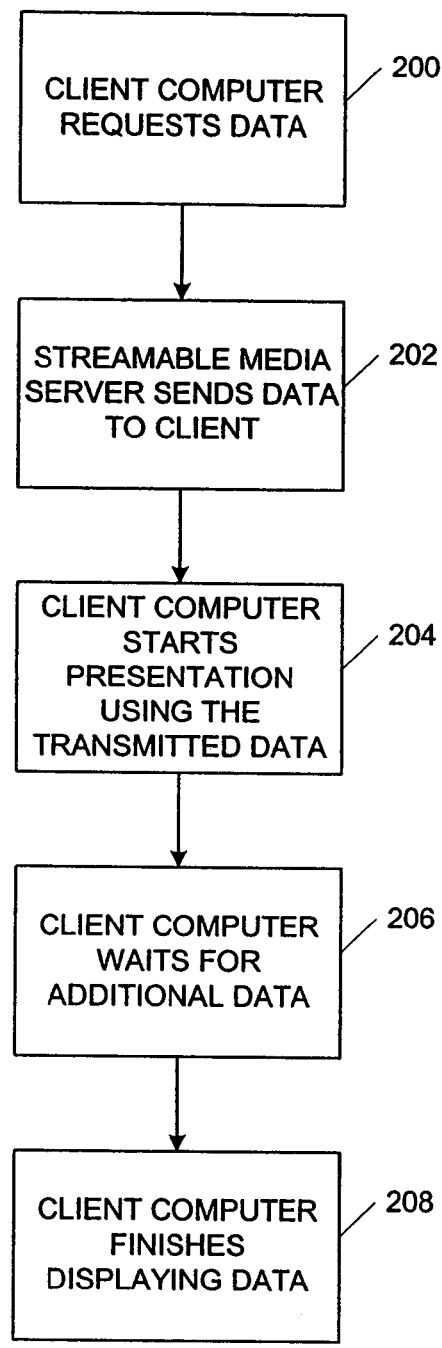
FIG. 2 is a flowchart of a conventional data streaming process.
Figure 3:
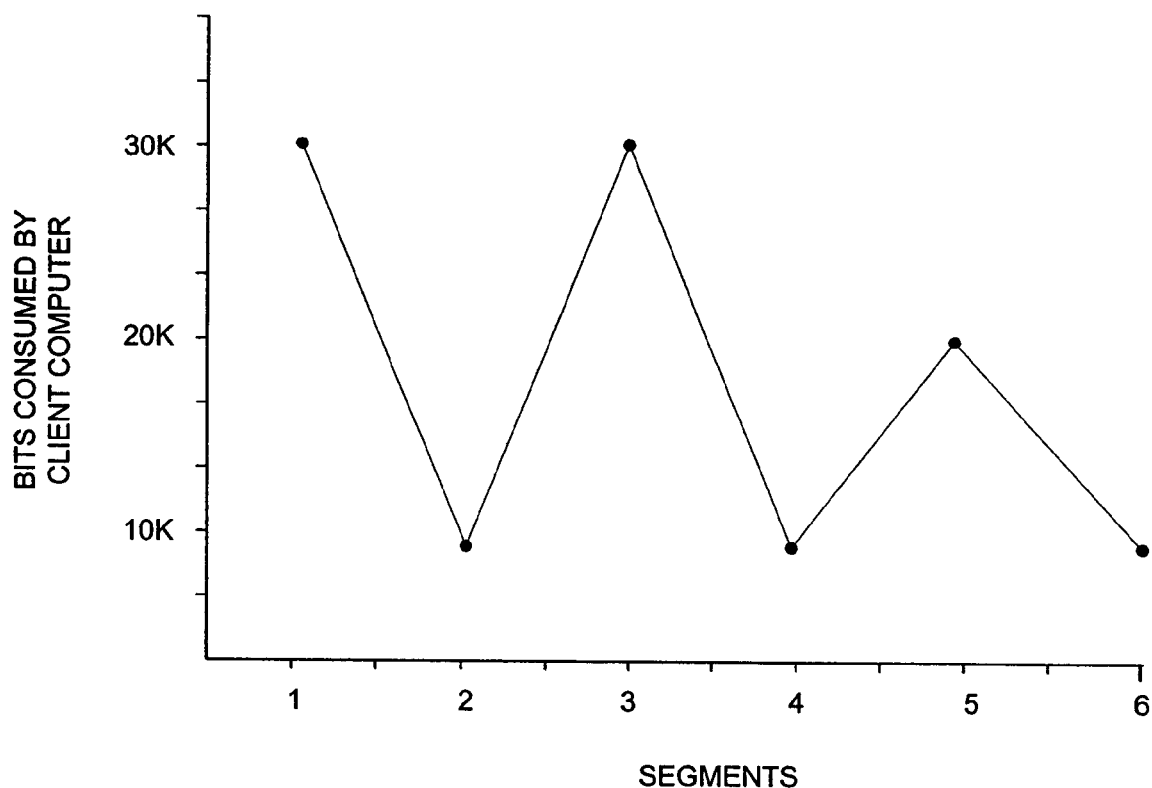
FIG. 3 is a bit consumption graph illustrating the number of bits that are used by a traditional rendering program on the client computer of FIG. 1 during the presentation of a streamable data object.
Figure 4:
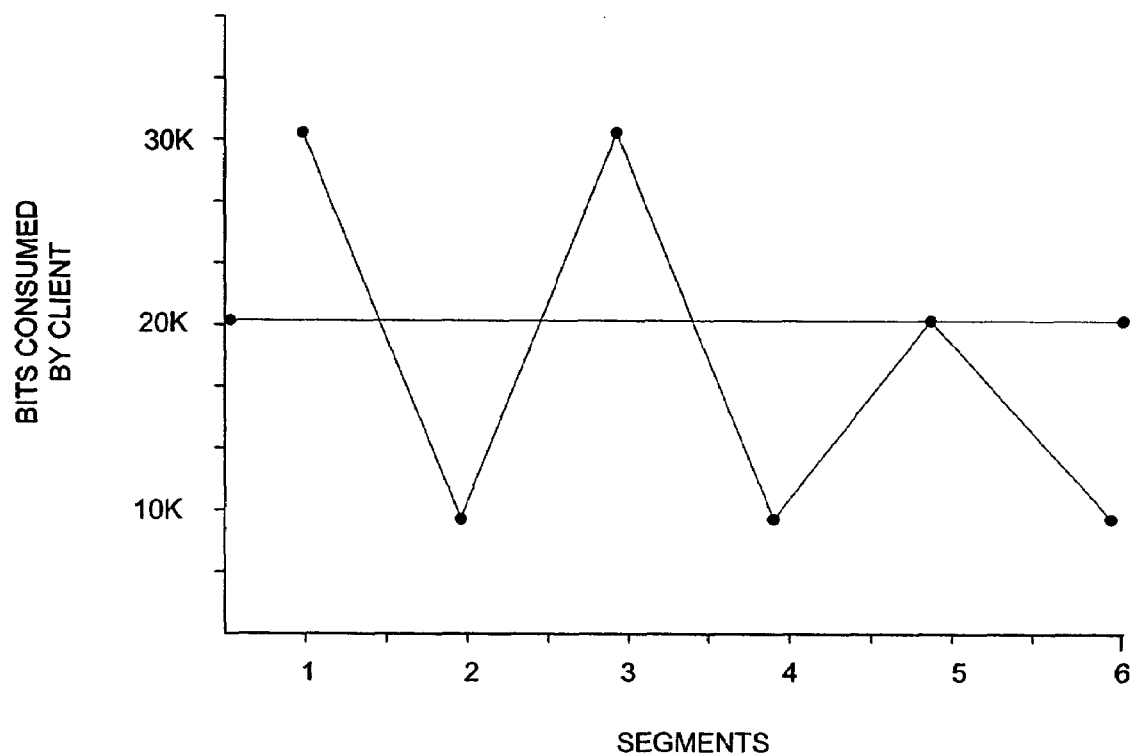
FIG. 4 is the bit consumption graph of FIG. 3 further illustrating the transmission rate between the streamable media server and the client computer of FIG. 1.

FIG. 1 illustrates a high-level block diagram of a streaming media system that can be used with an embodiment of the present invention. The streaming media system includes an encoder server 106, a content creation station 108, a streaming media server 110, and at least one client computer 112.

It is noted that the encoding server 106, the content creation station 108, the streaming media server 110, and the client computer 112 may each be any conventional general purpose computer using one or more microprocessors, such as a Pentium processor, a Pentium II processor, a Pentium Pro processor, an xx86 processor, an 8051 processor, a MIPS processor, a Power PC processor, or an ALPHA processor.

Figure 5:
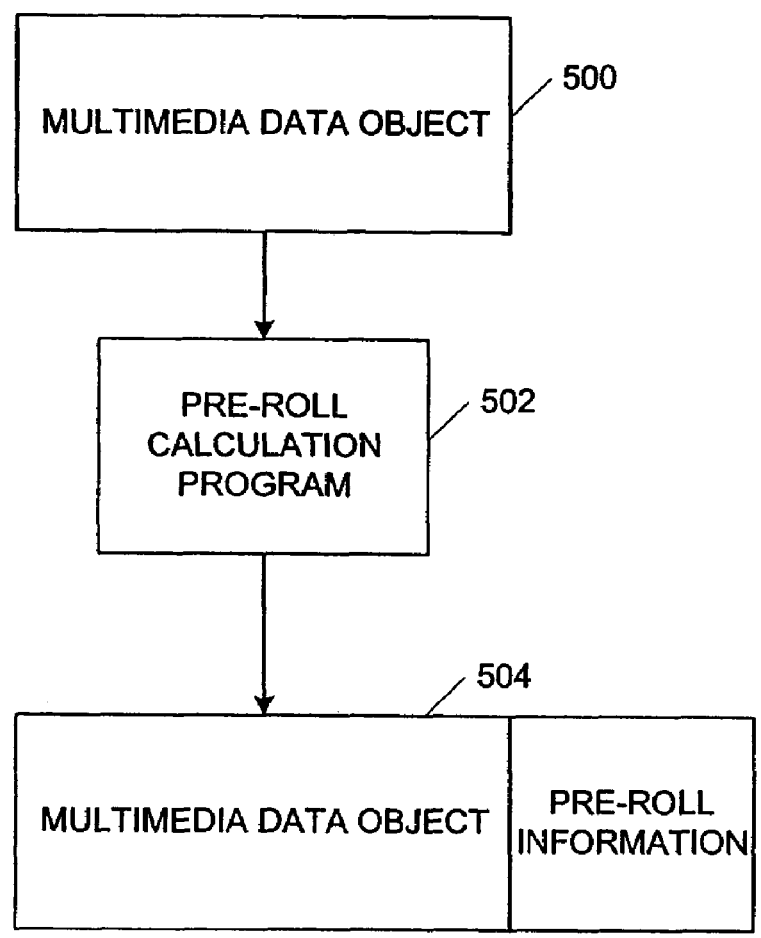
FIG. 5 is a high level functional block diagram illustrating the input and the output to a pre-roll calculation program in one embodiment of the invention.

In one embodiment of the present invention, the streaming media system includes a pre-roll calculation program 502 (FIG. 5). The pre-roll calculation program 502 determines an appropriate pre-roll transmission period for each segment of a multimedia data object 500 (FIG. 5). The pre-roll corresponds to a length of time for receiving data before beginning the rendering of the data, or indicates an amount of data, or both, the pre-roll allowing for the uninterrupted rendering of the data from any selected beginning point to completion.

A segment is defined as an identifiable portion of a multimedia object. A segment may be determined based upon the selected type of the multimedia object. For example, if the multimedia object uses frames as a presentation building block, as does a MacroMedia Shockwave Flash 2.0 multimedia file, each segment may by defined as a frame. Alternatively, if the multimedia object uses another measurement, such as time, for arranging the sequencing of the display of the multimedia data object, each segment may represent such a measurement. The purpose of identifying segments for the multimedia data object 500 is to be able to allow the user to render the multimedia data object 500 at a selected position within the multimedia data object 500.

The pre-roll calculation program 502 (FIG. 5) uses a multimedia data object 500 (FIG. 5) to create a modified multimedia data object 504 that includes pre-roll information. It is noted that the multimedia data object 500 may represent any type of multimedia presentation, such as a MacroMedia Shockwave Flash 2.0 file or a RealNetworks RealPix presentation.

In one embodiment, the pre-roll calculation program 502 (FIG. 5) includes various modules that are typically separately compiled and linked into a single executable program. Accordingly, the pre-roll calculation program 502 may be optionally integrated into one or more programs that reside and execute on any of the computing devices in the streaming media system, such as the encoder server 106 (FIG. 1), the content creation station 108 (FIG. 1), or the streaming media server 110 (FIG. 1).

The pre-roll calculation program 502 (FIG. 5) may be written in any programming language such as C, C++, BASIC, Pascal, JAVA, and FORTRAN. C, C++, BASIC, Pascal, JAVA, and FORTRAN are industry standard programming languages for which many commercial compilers can be used to create executable code. Further, the pre-roll calculation program 502 may be used in connection with various operating systems such as: UNIX, Solaris, Disk Operating System (DOS), OS/2, Windows 3.X, Windows 95, Windows 98, and Windows NT.

In addition to the pre-roll calculation program 502, one embodiment of the present invention includes a server program (not shown) that resides on the streaming media server 110 and a client rendering program (not shown) that resides on the client computer 112.

Method of Operation

Figure 6:
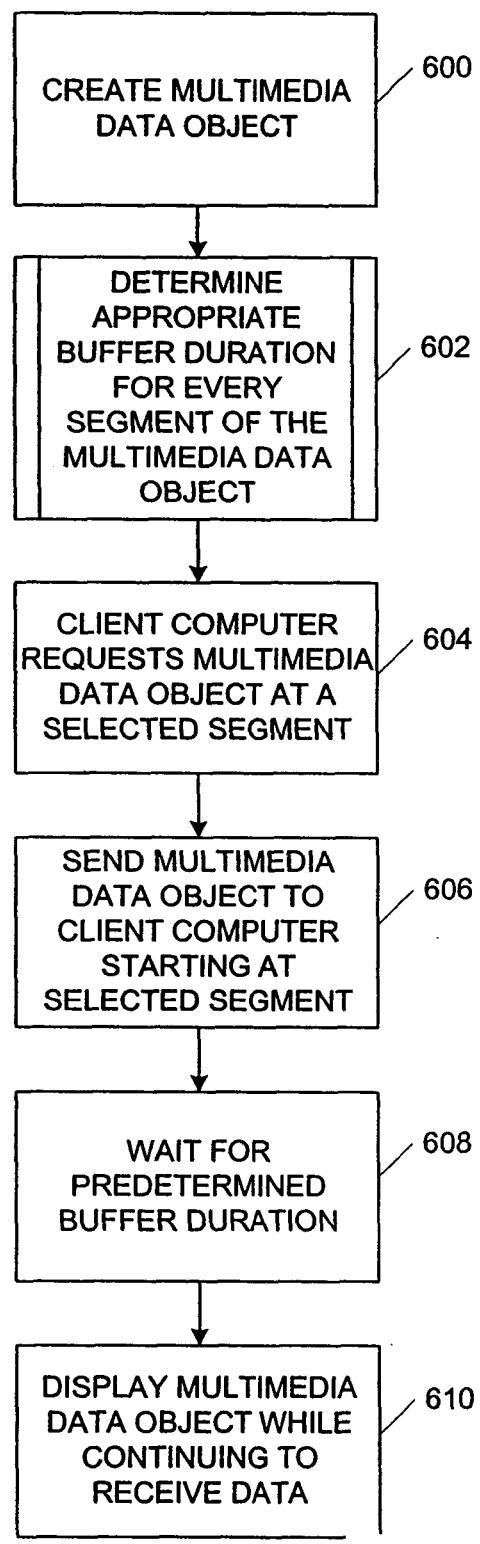
FIG. 6 is a flowchart illustrating the pre-roll calculation process of the pre-roll calculation program of FIG. 5.

FIG. 6 illustrates a high-level process of one embodiment of the present invention for creating and transmitting the multimedia data object 500 to a user. In a state 600, a user creates the multimedia data object 500 (FIG. 5) (e.g., a MacroMedia Shockwave Flash 2.0 file). The multimedia data object 500 may be created by the content creation station 108 or may be derived from a digitized signal from the microphone 102 (FIG. 1), the camera 104 (FIG. 1), or other input device.

Next, at a state 602, the pre-roll calculation program 502 (FIG. 5) determines an appropriate pre-roll (or buffer or duration) for every segment of the multimedia data object 500. The process for determining the pre-roll is described in further detail in reference to FIGS. 7 and 8. However, in summation, the pre-roll calculation program 502 iterates through each segment of the multimedia data object 500 (FIG. 5) and determines necessary pre-roll that is needed to play the entire multimedia data object 500 without interruption starting at any selected segment. After the pre-roll information is determined, the pre-roll calculation program 502 creates the multimedia data object 504 (FIG. 5) that incorporates the pre-roll information.

Continuing to a state 604, the client computer 112 requests the transmission of the multimedia object 500 starting at a user-selected segment. The transmission process is described in further detail below in a section entitled "Streaming Multimedia data Objects." In one embodiment, a user interface of a client rendering program presents a text box in which a user may enter via keystrokes a frame number of a frame-based multimedia object. In that embodiment, the client rendering program transmits a data packet including a request for the frame-based multimedia object and the frame number at which to begin playback.

Moving to a state 606, the streaming media server 110 receives the request, accesses the multimedia data object at the specified segment, and begins transmitting data corresponding to the specified segment of the multimedia data object 504 (FIG. 5) to the client computer 112 (FIG. 1). It is noted that the multimedia data object 504 should be placed on storage media, such as a hard disk accessible by the streaming media server 110 (FIG. 1), so that the multimedia data object 504 can be transmitted to the client computer 112 (FIG. 1). Further, it is also noted that, in one embodiment, as part of the process of sending the multimedia data object 504 to the client computer 112, the streaming media server 112 breaks the multimedia data object into packets and transmits ("streams") the packets across the network 100 according to a flow control scheme. One of ordinary skill in the art will appreciate that numerous flow control schemes exist, and the present invention is in no way limited by any flow control scheme.

Still referring to FIG. 6, at a state 608, the client computer 112 (FIG. 1) waits for the full data transmission indicated by the pre-roll for the selected segment. By waiting for the pre-roll and receiving the associated data, the client computer 112 has enough data from the multimedia data object 504 (FIG. 5) such that the client computer 112 can begin playing the multimedia data object 504 without interruption starting at the user-selected segment. It is noted that the present invention may prevent the premature playback of the multimedia data object 504 by employing any one of a number of standard synchronization schemes.

Finally, at a state 610, the client computer 112 (FIG. 1), starting at the user-selected segment, presents the multimedia presentation associated with the multimedia file to the user. While the presentation is in progress, the client computer 112 continues to receive the remainder of the multimedia data object 504 from the streamable media server 110 (FIG. 1). Advantageously, during the remainder of the presentation, the client computer 112 never interrupts the presentation to wait for additional data. The client computer 112 has pre-rolled enough of the multimedia data object 504 such that the client computer 112 always has in its possession at least enough data to continue the playback or rendering of the multimedia presentation without interruption.

Figure 7:
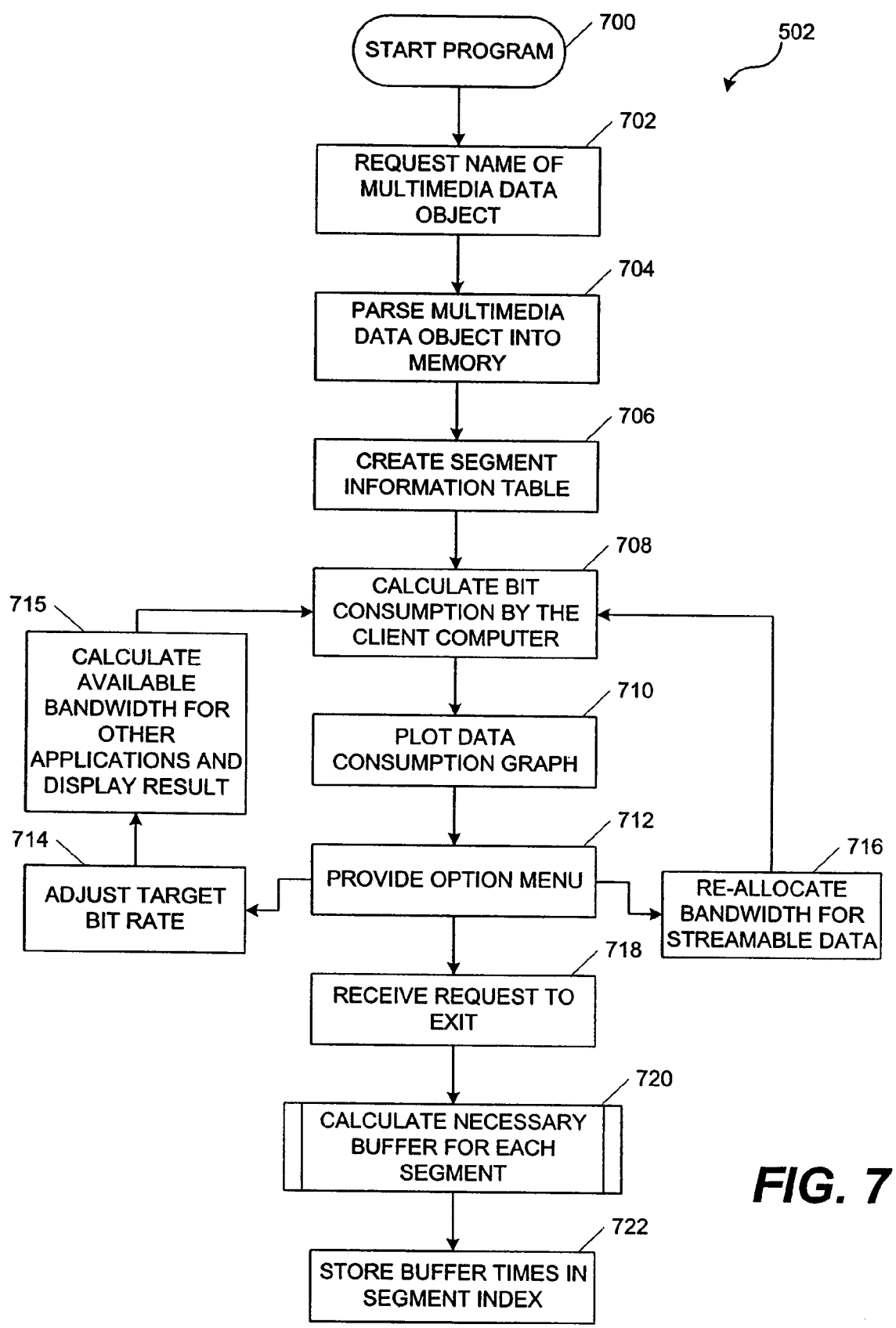
FIG. 7 is a flowchart illustrating a streaming media process in one embodiment of the present invention for streaming a multimedia data object.

FIG. 7 is a flowchart illustrating the process for calculating the pre-roll of each segment of the multimedia data object 500 (FIG. 5) in accordance with one embodiment of the present invention. FIG. 7 illustrates some of the steps that occur in state 602 of FIG. 6 in further detail. Exemplary screen shots of the pre-roll calculation program 102 are described in further detail in reference to FIGS. 9 and 10.

Before beginning at a start state 700, the user of the pre-roll calculation program 502 (FIG. 5) has obtained or created a multimedia data object, such as the multimedia data object 500. Further, the user wants to make the multimedia data object available for streaming the across the network 100 (FIG. 1). Using the pre-roll calculation program 502, the user can generate a consumption graph to visualize the expected presentation requirements of the multimedia data object over time in association with an amount of transmitted data. In other words, from the consumption graph, the user can determine pre-roll for any segment of the multimedia data object given a particular target bit rate at which data may be transmitted to a client computer 112. Further, the user can calculate the pre-roll at various target bit rates of the connection between the streaming media server 110 (FIG. 1) and the client computer 112 (FIG. 1).

After viewing the consumption graph, the user can identify particular segments of the multimedia data object 500 that consume more bandwidth than the other segments. Using the information from the consumption graph, the user can reorganize the layout of the multimedia data object 500 so as to reduce the bandwidth requirements of the identified segments. The user can again use the pre-roll calculation program 502 to determine if the reorganized multimedia data object 500 has a more evenly distributed consumption requirement for each of the segments, and can also determine if the pre-roll for the multimedia data object has increased or decreased, either generally or on a segment-by-segment basis.

Starting at the state 700 of FIG. 7, the user executes the pre-roll calculation program 502 (FIG. 5). Next, at a state 702, the pre-roll calculation program 502 requests the name of the streamable data object 500 (FIG. 5). Continuing to a state 704, the pre-roll calculation program 502 parses the selected multimedia data object 500 into the memory of the computer executing the pre-roll calculation program 502.

Moving to a state 706, the pre-roll calculation program 502 (FIG. 5) creates a segment information table based upon the multimedia data object 500 (FIG. 5). The segment information table includes information about each segment in the multimedia data object. For each segment in the multimedia data object 500, the pre-roll calculation program 502 generates a segment data structure that is stored in the segment information table. Each data structure in the segment information table contains the position and length or size of each segment within the multimedia data object 500. The segment information table may be structured as an array of segment data structures, or a linked list of segment data structures, or some other type of data structure.

Next, at a state 708, the pre-roll calculation program 502 (FIG. 5) calculates the number of bits that are consumed by the client computer 112 (FIG. 1) for each segment of the multimedia data object 500. Typically this information is readily calculable based upon the information in the multimedia data object 500. For example, in a MacroMedia Shockwave Flash 2.0 file, the number of bits that are consumed by the client computer 112 is the number of bits that are contained in each frame of the MacroMedia Shockwave Flash 2.0 file. Proceeding to a state 710, the pre-roll calculation program 502 displays a plot of the consumption of the multimedia data object 500 by the client computer 112 over time.

Figure 9:
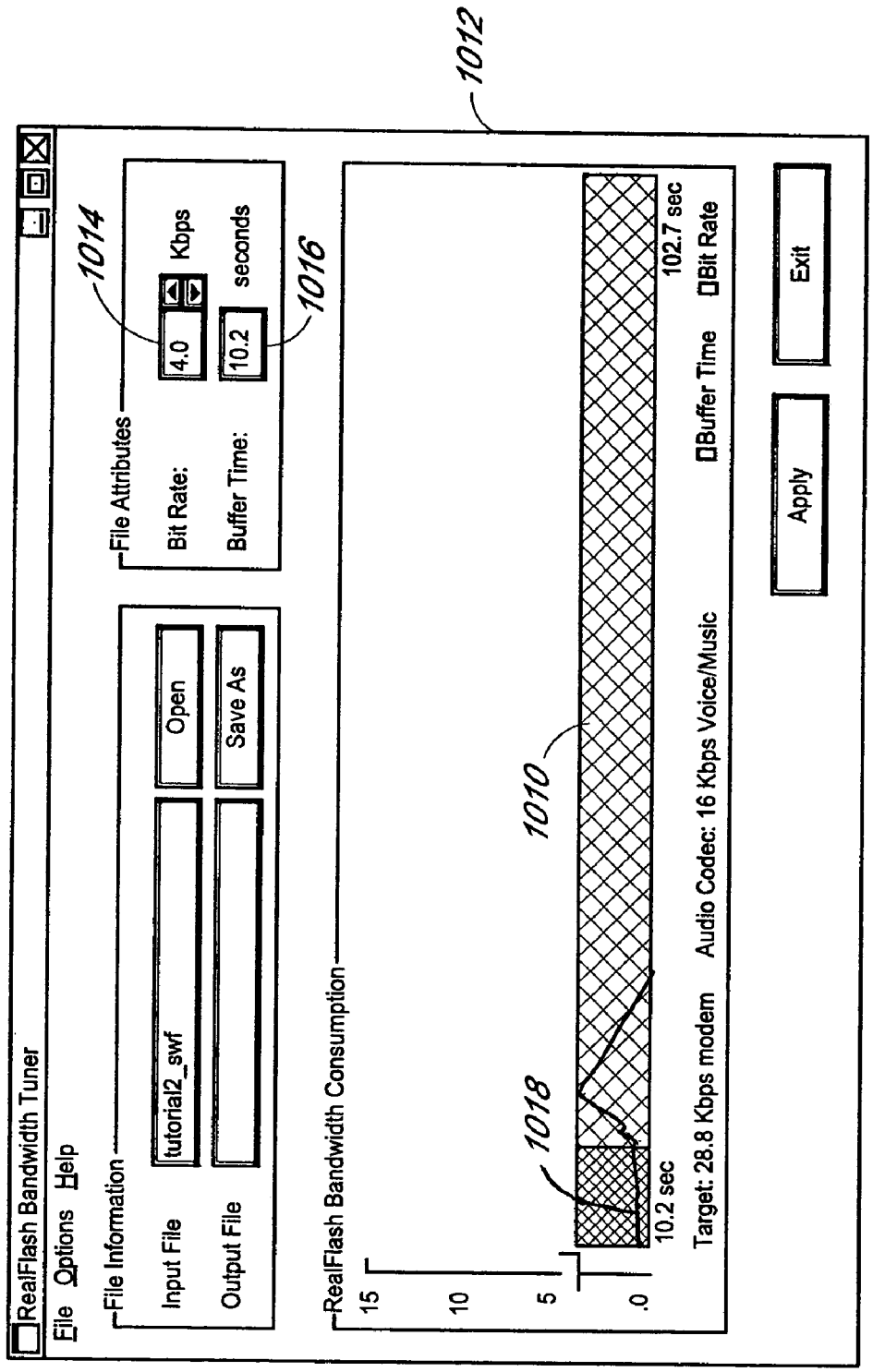
FIG. 9 is a screen display illustrating an exemplary user interface having a bit consumption graph.

At a next state 712, the pre-roll calculation program 502 provides an option menu screen, such as is shown in FIG. 9, to the user. Further, the pre-roll calculation program 502 displays various options and other items of information related to the multimedia data object 500. The three primary functions offered by the option menu include (i) adjusting the target bit rate, (ii) re-allocating the bandwidth for the streamable data, and (iii) exiting the program.

If the user requests to adjust target bit rate of the client computer 112 (FIG. 1), the pre-roll calculation program 502 (FIG. 5) proceeds to a state 714. The pre-roll calculation program 502 uses the target bit rate to calculate the total amount of bandwidth available for transmission of information from the streaming media server 110 (FIG. 1) to the client computer 112. The multimedia data object 504 (FIG. 5) may not be the only data object that is to be distributed to the user.

For example, assume that the multimedia data object 500 is a MacroMedia Shockwave Flash 2.0 animation file that is designed to be accompanied by some audio. Further assume that client computer 112 has a target bit rate of 28.8 Kbps. The provider of the MacroMedia Shockwave Flash 2.0 animation file should determine how much pre-roll is needed for a specified bit rate yet allowing some further bandwidth for the transmission of the accompanying audio file. If the user allocates 12 Kbps of the bandwidth for the MacroMedia Shockwave Flash 2.0 file, around 8 Kbps will be available for the user to transmit the accompanying audio file (assuming, for example, that another 8 Kbps is consumed by transmission overhead).

In another state 715, the pre-roll calculation program 502 calculates the amount of available bandwidth for other applications after the adjustment of target bit rate. The available bandwidth is defined to be equal to the adjusted bandwidth minus the selected bit rate. Using the example from above, assuming the target bit rate was adjusted from 28.8 Kbps to 56 Kbps (34 Kbps after deducting 22 Kbps for transmission overhead), the pre-roll calculation program 502 would subtract the selected bit rate 12 Kbps from the adjusted bit rate (including transmission overhead) of 34 Kbps to derive an available bit rate of 22 Kbps. The pre-roll calculation program 502 then returns to the state 708 to recalculate the bit consumption by the client computer 112.

Referring again to the state 712, if the user chose to re-allocated the bandwidth, then, in a state 716, the user adjusts the distribution of bandwidth between the multimedia data object 500 and other transmissions. The more bandwidth that is allocated to the multimedia data object 500, the shorter is the required pre-roll. Conversely, a decrease in the amount of bandwidth allocated to the multimedia data object 500 increases the pre-roll.

Referring yet again to the state 712, if the user chooses to exit, the pre-roll calculation program 502 (FIG. 5) exits the options menu in a state 718. Next, at a state 720, the pre-roll calculation program 502 calculates the pre-roll for each segment in the segment information table. The process for calculating the pre-roll for each frame is described below in further detail in reference to FIG. 8. However, in summary, the pre-roll calculation program 502 iterates (in reverse order) through each segment data structure in the segment information table, reads the segment information, and generates a segment index entry which is stored in a segment index.

Each segment index entry includes two items of information related to the segment. First, the segment index entry includes an element that describes the position of the segment within the multimedia data object. Second, each segment index entry includes an element representing the length or amount of the pre-roll for rendering the data object starting at the selected segment.

Finally, in the state 722, the pre-roll calculation program 502 (FIG. 5) stores multimedia data object 500 (FIG. 5) with a segment index, thereby creating the multimedia data object 504 (FIG. 5). In one embodiment of the invention, the segment index is appended to the end of the multimedia data object 500. Thus, each segment index entry may be stored in consecutive order following the last byte in the multimedia data object 500. In one embodiment of the invention, each segment index entry is stored as a pair of integers, one integer for the pre-roll, the other integer for the position of the segment within the multimedia data object 500.

It is noted that, in accordance with another embodiment of the present invention, the pre-roll calculation program 502 may also be adapted to calculate and store the required pre-roll for multiple target bit rates. Advantageously, this allows each client machine 112 to retrieve the multimedia data object 504 with a pre-roll most suited to its available bandwidth.

Figure 8:
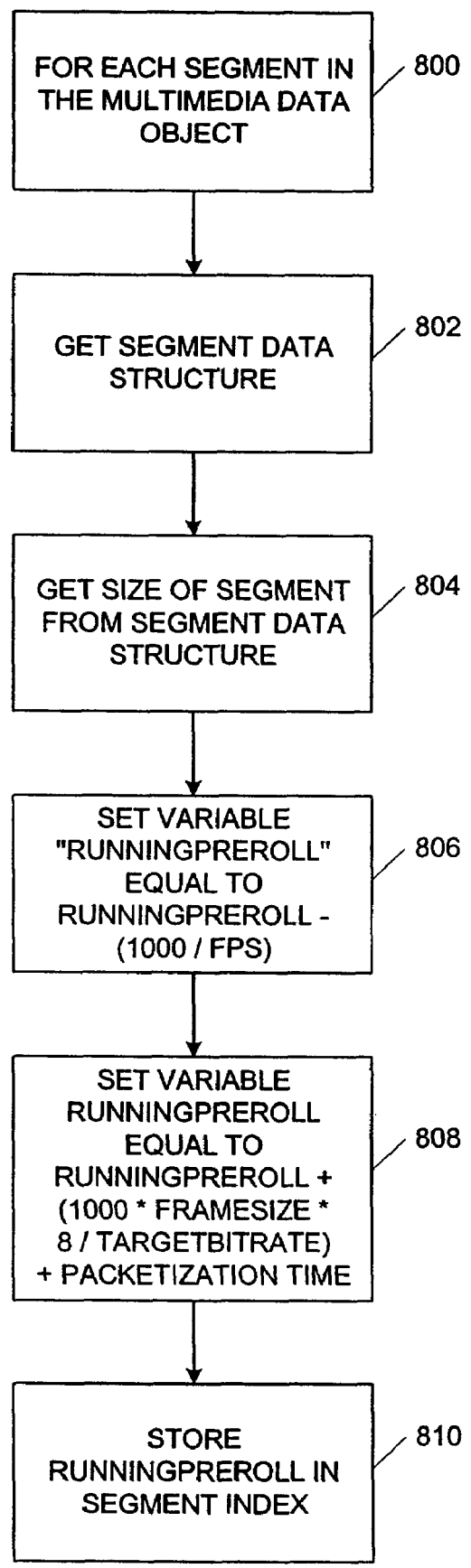
FIG. 8 is a flowchart illustrating a process in one embodiment of the present invention for calculating an appropriate pre-roll for each segment of a multimedia data object.

FIG. 8 illustrates an exemplary process for calculating the pre-roll for each segment of the multimedia data object 500 (FIG. 5) in accordance with one embodiment of the present invention. FIG. 8 illustrates the acts that occur in the state 720 of FIG. 7 in further detail. The purpose of the pre-roll calculation is to determine for each segment in the multimedia data object 500 a pre-roll, the pre-roll indicating a quantum of data to send to the client computer 112 (FIG. 1) before the client computer 112 begins presenting the multimedia data object 500 to the user.

Starting at a state 800 in accordance with one embodiment of the present invention, the pre-roll calculation program 502 (FIG. 5) iterates through each segment data structure in the segment information table (created in state 706 of FIG. 7) starting at the last segment data structure in the segment information table. The pre-roll calculation program 502 executes states 802-810 for each segment data structure in the segment information table.

Moving to a state 802, the pre-roll calculation program 502 accesses the first segment data structure from the segment information table (starting at the rear of the segment table). Advantageously, beginning at the rear of the segment table and processing the segments in reverse order in accordance with the disclosed embodiment enables pre-roll to be calculated for each segment during only a single pass through the information of the multimedia object. Next, at a state 804, the pre-roll calculation program 502 gets the size of the segment from the segment data structure.

Continuing to a state 806, the pre-roll calculation program 502, using Equation 1, determines the amount of time that the streaming media server 104 sends data for a specified segment.

| | |
|---|---|
| RunningPreroll = | 0; (first iteration). |
| SPS = | Segments per second. |
| (1) RunningPreroll = | RunningPreroll − 1000/SPS. |

The variable SPS is defined by the number of segments that the client computer 112 needs per second for the display of the multimedia object. For example, if the client computer 112 needs 10 segments per second, RunningPreroll is decremented by 100 milliseconds.

Next, at a state 808, the pre-roll calculation program 502, using Equation 2, determines the pre-roll for the selected segment.

| | |
|---|---|
| Segmentsize = | Length of a selected segment. |
| TargetbitRate = | Targeted bit rate of the client computer 112. |
| (2) RunningPreroll = | RunningPreroll + (1000 * Segmentsize * 8 / TargetbitRate) |

It is noted that there are 8 bits in a byte. To convert the segment size, typically stored as bytes, into bits, the segment size is multiplied by 8. It is also noted that the target bit rate is stored in units of Kilobits per seconds. Thus, the pre-roll calculation program 502 determines the pre-roll for the selected segment.

Moving to a state 810, if the value of RunningPreroll is negative (indicating that no pre-roll is necessary), the pre-roll calculation program 502 (FIG. 5) records in the segment index that the selected segment needs zero pre-roll. If the value of RunningPreroll is zero or greater, the pre-roll calculation program 502 stores the RunningPreroll plus a delta amount for a transmission overhead. In one embodiment of the invention, the delta amount is 750 milliseconds. The transmission overhead is the duration of time it takes to account for transmitting the multimedia object 500 across the network 100. The pre-roll is stored in units of milliseconds. In another embodiment, the pre-roll is stored as a number of bits or other units corresponding to an amount of data. The process flow then returns to the state 802 to get the next segment data structure from the segment information table. The process continues through states 802-810 for each segment until each segment has an associated pre-roll value.

Table 2 illustrates the state of the variables of Equations 1 and 2 after they have been executed for three exemplary segments (note, that, for the segments one, two and three of Table 2, segment two occurs prior to segment one, and segment three occurs prior to segment two during playback of the multimedia object). It is noted that the actual value of the variables will vary from implementation to implementation.

illustrated by a line 1018, the location of the line 1018 on the horizontal axis (representing time) indicating the amount of pre-roll.

Figure 10:
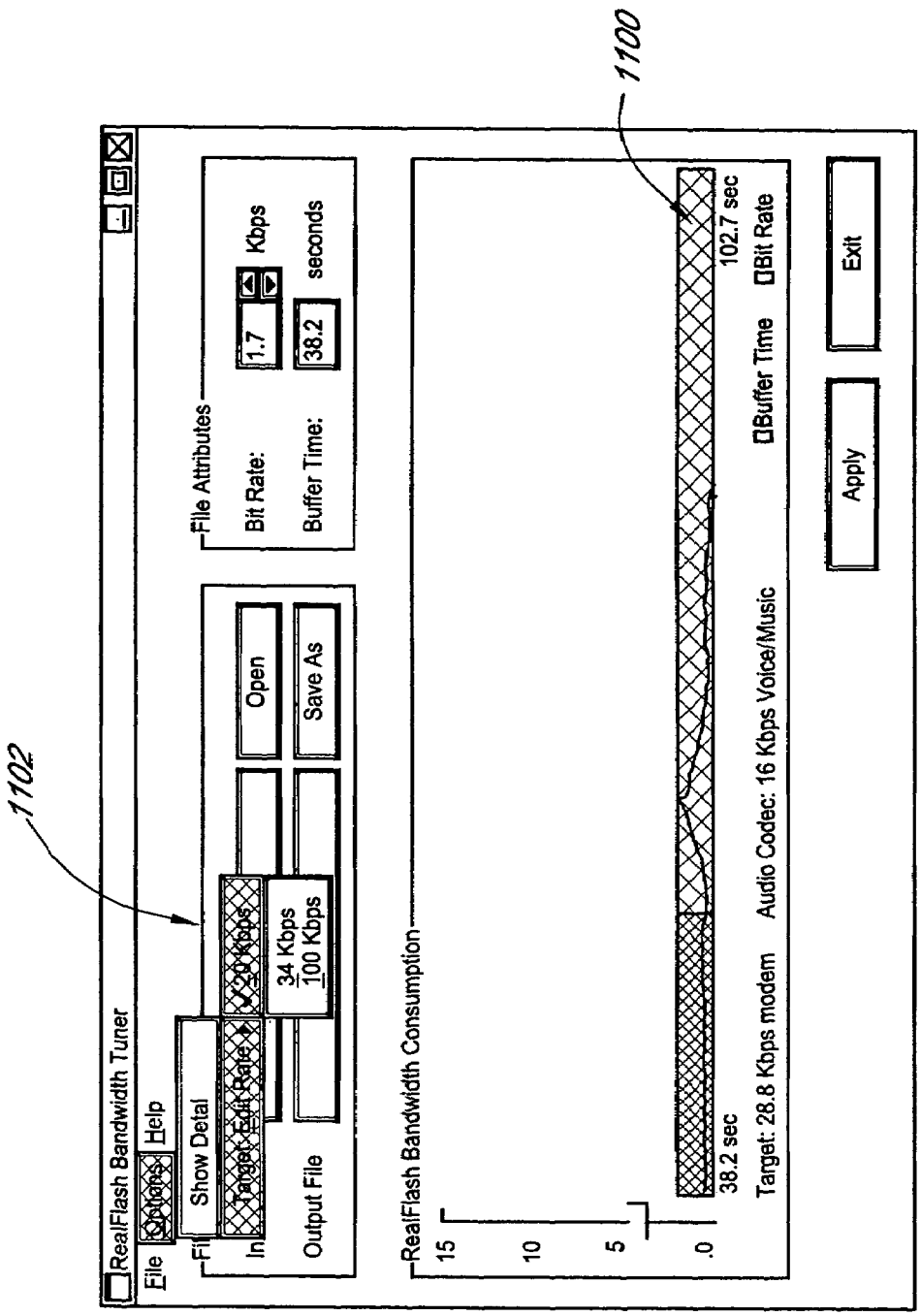
FIG. 10 is the screen display of FIG. 9 further illustrating an exemplary pull down menu that enables adjustment the target bit rate for the client computer.

FIG. 10 is an exemplary screen display 1100 that further illustrates a pull down sub menu 1102. Using the pull down sub menu 1102, the user can adjust the target bit rate for the client computer 112 (FIG. 1). By adjusting the target bit rate, the pre-roll calculation for the multimedia data object 500 is adjusted as well as the available bandwidth for other applications. The effect of adjusting the bit rate is explained above in further detail in reference to state 714 of FIG. 7.

Streaming Multimedia Data Objects

The process for streaming the multimedia data object 504 (FIG. 5) having pre-roll information is disclosed below. First, the multimedia data object 504 is stored in a computer readable medium accessible by the streaming media server 100 (FIG. 1) so that the streaming media server 110 can transmit the multimedia data object 504 to the client computer 112. Alternatively, the multimedia data object 504 could be stored on media readable by any computer that is accessible by the streaming media server 110.

Next, the client computer 112 (FIG. 1) signals to the streaming media server 110 that the client computer 112

TABLE 2

| Variables | Segment One (Equation 1) | Segment One (Equation 2) | Segment Two (Equation 1) | Segment Two (Equation 2) | Segment Three (Equation 1) | Segment three (Equation 2) |
|---|---|---|---|---|---|---|
| Running Preroll (ms) | −100 | 400 | 300 | 340 | 240 | 280 |
| Framesize (bytes) |  | 1000 |  | 100 |  | 100 |
| TargetBit Rate (bps) |  | 20,000 |  | 20,000 |  | 20,000 |
| Segments Per Second | 10 |  | 10 |  | 10 |  |

FIG. 9 is a screen display of an exemplary embodiment of the pre-roll calculation program 502 (FIG. 5). The option menu screen 1012 includes numerous pull-down menus, data fields, and slide bars that are commonly used in many window-based applications. It is noted that the positioning and size of the pull-down menu screens, the data fields, and the slide bars may be varied in alternative embodiments of the invention.

The option menu screen 1012 includes consumption graph 1010. A vertical axis of the graph 1010 indicates the number of bits that are consumed by the client computer 112 for a selected time period. The option menu screen 1012 also has a bit rate input window 1014 and a calculated buffer time (pre-roll) display window 1016. The bit rate display window 1014 indicates the bandwidth that the provider of the multimedia data object wants to dedicate to the multimedia data object 500 (FIG. 5).

In one embodiment of the present invention, the buffer time display window 1016 displays a pre-roll buffer time that permits the presentation associated with the multimedia data object to be played without interruptions. It is noted that the pre-roll buffer time is also graphically illustrated as a part of the consumption graph 1010. The pre-roll buffer time is wants to receive and render a selected segment of the multimedia data object 504 (FIG. 5). The streaming media server 110 then retrieves the header information for the multimedia data object 504. The header information can vary for each type of multimedia data object. Typical header information includes the title of the multimedia data object 504, the author of the multimedia data object 504, and the type of the multimedia data object 504. However, in one embodiment of the invention, the header also includes the pre-roll for the whole multimedia-media data object 504.

The client computer 112 then transmits to the streaming media computer 110 the number of the segment in the multimedia data object 110 that the client computer 112 has requested for rendering. In one embodiment of the invention, if the requested segment is zero, the client computer 112 waits the amount of time indicated in the header before rendering the multimedia data object 504. However, if the requested segment was greater than zero, the streaming media server 110 searches the segment index in the multimedia data object 504 to find the pre-roll for the selected segment. It is noted that depending on the embodiment of the invention, the pre-roll information is stored before, after, or in the middle, or intermixed with the multimedia data object 500.

Thus, in an embodiment wherein the pre-roll information is at the end of the multimedia data object 504, the streaming media server 110 uses the header information of the multimedia data object 504 to determine the last byte of the multimedia data object 504. The streaming media server then indexes into the segment index (which is positioned following the last byte of the multimedia data object) to determine the pre-roll of the segment that was selected by the client computer 112.

The streaming media server 110 then transmits the multimedia data object 504 in packets having a time stamp of zero. The client computer 112 receives the packets, but performs no rendering of the received data in the packets until the time stamp is greater than zero. Once the streaming media server 110 determines that the time indicated by the pre-roll for the selected segment has passed, the streaming media server 110 starts incrementing the time stamps.

After the client computer 112 receives a packet with a non-zero time stamp, the client computer 112 starts rendering the received data from the multimedia data object 504 into a presentation. While the presentation is being rendered, the client computer 112 continues to receive the remainder of the multimedia data object 500 that has not yet been transmitted. Having received data without rendering it for the pre-roll duration, the client computer 112 displays the presentation without ever pausing due to insufficient data.

Advantageously, the streaming media system of the invention provides for the determination of a pre-roll for each segment of a multimedia data object 504. The pre-calculation of the pre-roll insures that a client computer, such as the client computer 112 (FIG. 1), has enough data from the multimedia object 504 such that playback or rendering of the multimedia data object 504 is uninterrupted. Further, the user can seek or jump to any portion (segment) of the presentation represented by the multimedia data object 500 and render the multimedia data object 500 without subsequent interruptions.

In another embodiment, the present invention advantageously adjusts pre-roll to variations in the actual bit rate or bandwidth available to the client computer 112, adjusting the pre-roll down when bandwidth increases, and adjusting the pre-roll up when bandwidth decreases. Thus, the adjusted pre-roll varies inversely with changes in bandwidth. Accordingly, the streaming media server 110 first determines or estimates the actual bit rate at which the client computer 112 receives data. It will be appreciated by one of ordinary skill in the art that numerous techniques exist for estimating bandwidth. After estimating the available bandwidth to be x Kbps, for example, the streaming media server 110 calculates the ratio (y Kbps)/(x Kbps) where y Kbps is the bit rate at which pre-roll was calculated by the pre-roll calculation program. The streaming media server 110 multiplies the pre-roll for a selected segment by the calculated ratio to arrive at an adjusted pre-roll. The streaming media server 110 then begins to transmit packets of the multimedia data object 504 to the client computer, placing time stamp values of zero on the packets until the time indicated by the adjusted pre-roll has passed, at which time the streaming media server 110 begins incrementing the values of the time stamps. It will be appreciated that before calculating the ratio, the streaming media server 110 may subtract out proportional portions of the bandwidth allocated to transmission overhead or to the transmission of other data such as, for example, other media objects. The disclosed ratio technique represents only one manner in which the present invention may calculate an adjusted pre-roll based on variations in bandwidth available to a client computer 112.

Further, the present invention provides a graphical utility providing pre-roll information about a multimedia data object 504 such that a user of the utility can easily perceive any bandwidth intensive portions of a multimedia data object. The user can then re-arrange or modify the multimedia data object to minimize delays associated with random accesses to the multimedia data object.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of analyzing a multimedia data object that is adapted for rendering on an electronic device, the method comprising:
   identifying a transmission rate;
   prior to transmission of the multimedia data object to a receiving device targeted to display the multimedia data object, determining a buffer time based upon the transmission rate and at least one characteristic of the multimedia data object; and
   indicating the buffer time.

2. The method of claim 1, wherein the characteristic includes a presentation requirement of the multimedia data object.

3. The method of claim 1, additionally comprising transmitting the buffer time from a server computer to a client computer.

4. A method of analyzing a multimedia data object that is adapted for rendering on an electronic device, the method comprising:
   identifying a transmission rate;
   determining a buffer time based upon the transmission rate and at least one characteristic of the multimedia data object;
   indicating the determined buffer time; and
   transmitting the indicated buffer time from a server computer to a client computer.

5. The method of claim 4, wherein the characteristic includes a presentation requirement of the multimedia data object.

6. An electronic device, comprising:
   a data object;
   a display; and
   a component configured to:
      identify a transmission rate;
      determine a buffer size or time that is used for buffering data from the data object on another device based upon the identified transmission rate and at least one characteristic of the data object, wherein the buffer size or time is determined prior to transmission of the data object; and
      display the buffer size or time.

7. The electronic device of claim 6, wherein the component displays a consumption graph on the display.

8. The electronic device of claim of claim 7, wherein the electronic device modifies the consumption graph based upon a provided transmission rate.

9. A screen display, comprising:
an area for displaying data consumption characteristics of a multi-media object having non-uniform consumption characteristics; and
an area for displaying a buffer time for transmitting the multi-media object,
wherein the buffer time is determined based upon an identified transmission rate and at least one characteristic of the multi-media object, and
wherein the buffer time is determined prior to transmission of the multi-media object to a receiving device targeted to display the multi-media object.

10. The screen display of claim 9, wherein the buffer time indicates a duration of time that must pass in which an electronic device receives portions of the multi-media data object at a target transmission rate before the before the multi-media object is presented to a user.

11. The screen display of claim 9, wherein the screen display is displayed by an electronic device.

12. The method of claim 1, wherein indicating the buffer time comprises displaying the buffer time.

13. The method of claim 12, wherein displaying the buffer time comprises graphically displaying the buffer time.

14. The method of claim 1, wherein indicating the buffer time comprises indicating the buffer time in a header of the multimedia data object.

15. The method of claim 1, wherein indicating the buffer time comprises incrementing a time stamp.

16. The method of claim 2, further comprising indicating the presentation requirement as a function of time.

17. The method of claim 2, wherein the presentation requirement comprises a data consumption requirement at a plurality of locations of the multimedia data object.

18. The method of claim 4, wherein indicating the determined buffer time comprises displaying the determined buffer time.

19. The method of claim 18, wherein displaying the determined buffer time comprises graphically displaying the determined buffer time.

20. The method of claim 4, wherein indicating the determined buffer time comprises indicating the determined buffer time in a header of the multimedia data object.

21. The method of claim 4, wherein indicating the determined buffer time comprises incrementing a time stamp.

22. The method of claim 5, further comprising indicating the presentation requirement as a function of time.

23. The method of claim 5, wherein the presentation requirement comprises a data consumption requirement at a plurality of locations of the multimedia data object.

24. The device of claim 6, wherein the characteristic includes a presentation requirement of the data object.

25. The device of claim 24, wherein the component is further configured to display the presentation requirement as a function of time.

26. The device of claim 24, wherein the presentation requirement comprises a data consumption requirement at a plurality of locations of the multimedia data object.

27. The screen display of claim 9, wherein the characteristic includes a presentation requirement of the data object.

28. The screen display of claim 27, further comprising an area for displaying the presentation requirement as a function of time.

29. The screen display of claim 27, wherein the presentation requirement comprises a data consumption requirement at a plurality of locations of the multimedia data object.

* * * * *

UNITED STATES PATENT AND TRADEMARK OFFICE
CERTIFICATE OF CORRECTION

PATENT NO. : 7,284,065 B2 Page 1 of 1
APPLICATION NO. : 10/646933
DATED : October 16, 2007
INVENTOR(S) : Rahul Agarwal et al.

It is certified that error appears in the above-identified patent and that said Letters Patent is hereby corrected as shown below:

Column 17 Claim 10 line 16 remove the second set of "before the"

Signed and Sealed this

Twentieth Day of May, 2008

JON W. DUDAS
*Director of the United States Patent and Trademark Office*